Patented June 27, 1933

1,915,894

UNITED STATES PATENT OFFICE

SVEND AAGE KRÜGER, OF COPENHAGEN, DENMARK

BASE-EXCHANGING FILTER MATERIAL

No Drawing. Application filed December 17, 1929, Serial No. 414,828, and in Sweden January 5, 1929.

The present invention relates to a process for manufacturing of base-exchanging filter materials made of a raw material consisting of clay, and to filter materials produced by this process and especially adapted to remove the lime, magnesia, iron and manganese, and has for its object to produce a filter material that does not become soft by action of the water, but remains hard and pure and, therefore, does not soil the water to be purified, nor clog the filters used nor cause any other drawbacks due to filter material being dissolved by the water.

Heretofore it has been attempted, by baking, to render the naturally occurring clays containing base-exchanging substances, for instance zeolites, better adapted to resist the action of water than when in their natural state.

This baking process has been effected at higher or lower temperatures. By baking at high temperatures a product is obtained which is very hard but, at the same time the base-exchanging properties are reduced. If the temperature is increased so far that all the chemically combined water in the initial material is given off, then the product becomes hard as stone but, at the same time, entirely inactive. The known baking processes have always been directed in such a manner that the baking was effected in the usual most economical manner, i. e. so that the baking was performed with oxidizing flame.

Experience has now shown that a product perfectly insoluble in water and of high base-exchanging efficiency can be produced when the baking is performed in such a manner that the initial material is not exposed to any oxidation. According to the present invention this result is attained by the baking being effected without the presence of oxidizing substances, i. e. especially without the presence of oxidizing gases, for instance oxygen, while on the other hand reducing substances, such as reducing gases, for instance carbonoxide CO, may very well be present, there being for instance used a reducing flame, and if the baking is effected in closed chambers the atmosphere in the same may contain reducing gases. In the last mentioned case the baking may be effected in electrically heated furnaces.

The baking may be effected at temperatures between 550 and 900° C., all depending on the properties of the initial material and the construction of the furnace used (muffle furnace, rotary furnace etc.).

Experience has shown that according to this process a product can always be produced that does not become soft in water and retains its base-exchanging character. It has further been shown that this result is attained with certainty when the baking process is directed in such a manner that in any case no divalent iron ($Fe^{II}$) contained in the clay used is converted into trivalent iron ($Fe^{III}$), while no harm is done if smaller or greater quantities of trivalent iron are converted into divalent iron.

In its natural state the clay employed must contain sodium (Na) in such a loose combination that by the so-called base-exchange the sodium will exchange place with the lime, magnesia, iron and manganese contained in the water. Otherwise the raw material may be of highly varying composition in respect to its contents of silicic acid ($SiO_2$), aluminium ($Al_2O_3$), iron oxides (FeO and $Fe_2O_3$), lime (CaO), magnesia (MgO), oxide of sodium ($Na_2O$) and oxide of potassium ($K_2O$).

By way of example the following may be mentioned:

A sample of clay (A) of the following composition:

| | Percent |
|---|---|
| $SiO_2$ | 58.40 |
| $Al_2O_3$ | 19.23 |
| FeO | 0.67 |
| $Fe_2O_3$ | 5.30 |
| CaO | 0.60 |
| MgO | 0.65 |
| $Na_2O$ | 2.50 |
| $K_2O$ | 1.14 |
| Moisture | 6.01 |
| Combined water and organic matters | 5.50 | was in the usual manner exposed directly to the combustion gases and baked to a product (B) in an electric furnace at a temperature between 600 and 700° C. Another sample of (A) was baked at the same temperature in special manner so that no oxidation took place. In order to be perfectly sure that no oxidation took place the baking was directed in such a manner that a slight reduction was effected, whereby some of the trivalent iron compounds were converted into divalent compounds. This product is called (C). The baking was further directed in such a manner that the incineration remnants in (B) and (C) were practically alike by weight. Figured relatively to the incineration remnants the finished products contained the following percentages:

|  | A | B | C |
|---|---|---|---|
| Divalent iron $Fe^{II}$ | 0.67 | 0.17 | 0.87 |
| Trivalent iron $Fe^{III}$ | 5.30 | 5.80 | 5.10 |

A distinguishing feature of the clay used was that the slightest admission of oxygen during the baking immediately gave the product a faint reddish shade, while when any trace of oxygen was excluded the color of the material remained unaltered. The clay used is a base-exchanging clay containing no essential amount of glauconite. When examined, the products (B) and (C) had the same base-exchanging effect for softening of water; but after the course of some hours the product (B) became soft, while the product (C) retained the hardness acquired by the baking.

It is evident that the practical value of a base-exchanging material does not depend solely on the base-exchanging capacity, but quite as much, or more, on the ability of the material to resist the powdering action of water. Both of these properties are attained by the novel process.

I claim:

1. The process of manufacturing base-exchanging filter materials for softening water, consisting in baking base-exchanging clays, containing no essential amount of glauconite, without the presence of oxidizing substances.

2. The process of manufacturing base-exchanging filter materials for softening water, consisting in baking base-exchanging clays, containing no essential amount of glauconite, in an atmosphere not containing any oxidizing gases.

3. The process of manufacturing base-exchanging filter materials for softening water, consisting in baking base-exchanging clays, containing no essential amount of glauconite, in an atmosphere containing no free oxygen.

4. The process of manufacturing base-exchanging filter materials for softening water, consisting in baking base-exchanging clays, containing no essential amount of glauconite, in an atmosphere containing no oxidizing gases, but reducing gases.

5. The process of manufacturing base-exchanging filter materials for softening water, consisting in baking base-exchanging clays, containing no essential amount of glauconite, in a reducing flame.

6. The process of manufacturing base-exchanging filter materials for softening water, consisting in baking base-exchanging clays, containing no essential amount of glauconite, in such a way, that none of the divalent iron contained in the initial material is converted into trivalent iron.

7. The process of manufacturing base-exchanging filter materials for softening water, consisting in baking base-exchanging clays, containing no essential amount of glauconite in such a way, that larger or smaller quantities of trivalent iron contained in the initial material are converted into divalent iron.

8. Filter material produced from base-exchanging clays containing no essential amount of glauconite by baking without simultaneous oxidation.

In testimony whereof I affix my signature.

SVEND AAGE KRÜGER.